United States Patent [19]

Cheresnowsky et al.

[11] Patent Number: 5,273,726
[45] Date of Patent: Dec. 28, 1993

[54] REMOVAL OF ALUMINUM FROM AMMONIUM MOLYBDATE SOLUTION

[75] Inventors: Michael J. Cheresnowsky; Michael J. Miller; Shirley S. Schaeffer, all of Towanda, Pa.

[73] Assignee: GTE Products Corporation, Danvers, Mass.

[21] Appl. No.: 695,837

[22] Filed: May 6, 1991

[51] Int. Cl.$^5$ .............................. C01G 37/00
[52] U.S. Cl. ......................... 423/56; 423/54; 423/58; 423/61; 423/606; 423/593; 423/122
[58] Field of Search ............ 423/54, 56, 58, 61, 423/606, 55, 593, 122

[56] References Cited

U.S. PATENT DOCUMENTS

| | | |
|---|---|---|
| 3,829,550 | 8/1974 | Ronzio et al. ............ 423/54 |
| 3,848,049 | 11/1974 | Ronzio et al. ............ 423/54 |
| 3,957,946 | 5/1976 | Ronzio et al. ............ 423/56 |
| 4,273,745 | 6/1981 | Laferty et al. ............ 423/54 |
| 4,525,331 | 6/1985 | Cheresnowsky ............ 423/54 |
| 4,555,386 | 11/1985 | Cheresnowsky ............ 423/54 |
| 4,596,701 | 6/1986 | Cheresnowsky ............ 423/54 |
| 4,601,890 | 7/1986 | Cheresnowsky et al. ............ 423/54 |
| 4,604,267 | 8/1986 | Cheresnowsky ............ 423/54 |
| 4,702,895 | 11/1987 | Cheresnowsky et al. ............ 423/54 |
| 4,735,791 | 4/1988 | Cheresnowsky ............ 423/606 |
| 4,885,144 | 12/1989 | Cheresnowsky ............ 423/54 |
| 5,002,740 | 3/1991 | Cheresnowsky et al. ............ 423/56 |

*Primary Examiner*—Mark L. Bell
*Assistant Examiner*—Thomas G. Dunn, Jr.
*Attorney, Agent, or Firm*—James Theodosopoulos

[57] ABSTRACT

Aluminum is removed from ammonium molybdate solution by the use of $Mg^{+2}$ in the solution to precipitate out the aluminum.

5 Claims, No Drawings

REMOVAL OF ALUMINUM FROM AMMONIUM MOLYBDATE SOLUTION

BACKGROUND OF THE INVENTION

This invention is concerned with the purification of molybdenum. Examples thereof are shown in the following U.S. Pat. Nos. 4,933,152; 4,814,148; 4,735,791; 4,702,895; 4,643,884; 4,604,267; 4,604,266; 4,601,890; 4,596,701; 4,555,386; 4,525,331; 4,207,296.

SUMMARY OF THE INVENTION

This invention is particularly concerned with purifying molybdenum of aluminum. The above patents disclose ion exchange to remove aluminum. However that process does not generally attain the desired purity level satisfactorily.

This invention discloses the use of $Mg^{+2}$ in ammonium molybdate solution to remove the aluminum. The aluminum is separated from the solution by precipitation and is removed from the solution by, for example, filtration. To obtain the desired precipitation, the magnesium must be present in the amount of 0.01 to 0.04 moles per liter and the pH must be between 9.0 and 9.8. Within this range, optimum results are obtained at higher pH and higher magnesium content. U.S. Pat. No. 4,702,895 discloses the use of magnesium to remove non-metallic elements, specifically, phosphorus and arsenic, from ammonium molybdate solution.

DESCRIPTION OF THE PREFERRED EMBODIMENT

In one example, the source of molybdenum was acid-washed technical grade $MoO_3$. A series of tests was run in each of which 60 grams of $MoO_3$ was digested in 200 ml $NH_4OH$ in a 600 ml pressure reactor to form ammonium molybdate solution. Digestion times varied between one and three hours and digestion temperatures varied between 40° and 80° C. Magnesium was added in the form of 2M $MG(NO_3)_2\ 6H_2O$ and the amount added varied between 1 ml and 3.8 ml. The molarity of the $NH_4OH$ varied between 4.46 (which gave a pH of 9.0) and 6.40 (which gave a pH of 9.8). The ammonium molybdate was then cooled to 30° C. and filtered to remove the precipitate. Magnesium was then removed from the ammonium molybdate solution by ion exchange, as disclosed in U.S. Pat. No. 4,702,895. The solution was then evaporated to dryness to form ammonium dimolybdate (ADM) crystals. The ADM was then fired at 500° C. to form $MoO_3$ for analysis to determine Al content. In all cases Al content was less than 18 ppm. At pH of 9.8 and at 0.04 mole Mg per liter, Al content was only 3 ppm.

This invention was also used to remove Al from a spent ammonium molybdate (SML) liquor of the type disclosed in U.S. Pat. No. 4,933,152. The SML liquor contained 250 grams Mo per liter and 0.036 grams Al per liter, which equals 97 ppm Al in $MoO_3$. 2M $MgCl_2\ 6H_2O$ was added to the SML liquor to obtain 0.01 and 0.04 moles Mg per liter at pH levels of 9 and 9.5. Reaction time was 16 hours at 23° C. The precipitates were filtered out and each sample was converted to $MoO_3$ as above and analyzed. At 0.04 moles Mg per liter, Al was reduced to 2.5 ppm at both pH levels. At 0.01 moles Mg per liter, Al was reduced to 6 ppm at pH of 9.5 and 7 ppm at pH of 9.0.

Other soluble magnesium compounds that can be used are $Mg(OH)_2$, $MgO$ and $MgCO_3$. However, since $MG(OH)2$ and $MgO$ do not dissolve directly in ammonium molybdate solution, they would be dissolved in an acidic slurry containing $MoO_3$. Then $NH_4OH$ would be added to dissolve the $MoO_3$ from ammonium molybdate solution.

We claim:

1. A method of removing Al from $MoO_3$ comprising the steps of digesting the $MoO_3$ with $NH_4OH$ and $Mg^{+2}$ at a pH of 9.0 to 9.8, the $Mg^{+2}$ content being between 0.01 to 0.04 moles per liter, to form ammonium molybdate solution and to precipitate out the Al, and separating the precipitate from the ammonium molybdate solution.

2. The method of claim 1 including the step of removing the $Mg^{+2}$ from the ammonium molybdate solution by ion exchange.

3. The method of claim 1 wherein the precipitate is separated by filtration.

4. A method of removing Al from ammonium molybdate solution comprising the steps of adding a soluble magnesium compound to the ammonium molybdate solution to precipitate out the Al, and filtering out the precipitate from the ammonium molybdate solution.

5. The method of claim 4 wherein the magnesium compound is $Mg(NO_3)_2.6H_2O$ or $MgCl_2.6H_2O$ or $MG(OH)_2$ or $MgO$ or $MgCO_3$.

* * * * *